(12) United States Patent
Jambor et al.

(10) Patent No.: US 6,247,724 B1
(45) Date of Patent: Jun. 19, 2001

(54) AIR BAG SYSTEM FOR A MOTOR VEHICLE

(75) Inventors: Arno Jambor, Vaihingen; Wolfgang Kerner, Eutingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/348,071

(22) Filed: Jul. 6, 1999

(30) Foreign Application Priority Data

Jul. 3, 1998 (DE) .............................. 198 29 755

(51) Int. Cl.$^7$ .............................. B60R 21/16; B62D 1/04
(52) U.S. Cl. .................. 280/731; 280/728.2; 280/728.3; 74/552
(58) Field of Search ............... 280/728.3, 731, 280/732, 728.2; 74/552

(56) References Cited

U.S. PATENT DOCUMENTS

| 4,925,209 | * | 5/1990 | Sakurai | 280/732 |
|---|---|---|---|---|
| 4,989,896 | * | 2/1991 | DiSalvo et al. | 280/732 |
| 5,131,678 | * | 7/1992 | Gardner et al. | 280/732 |
| 5,354,094 | | 10/1994 | Matano et al. | 280/728.3 |
| 5,611,564 | * | 3/1997 | Bauer | 280/728.3 |
| 5,685,056 | * | 11/1997 | Fischer | 280/728.3 |
| 5,851,022 | * | 12/1998 | Yamamoto et al. | 280/728.3 |
| 5,901,977 | * | 5/1999 | Knox et al. | 280/728.3 |
| 5,927,747 | * | 7/1999 | Farrington | 280/728.3 |
| 6,045,153 | * | 4/2000 | Sommer et al. | 280/728.3 |
| 6,079,733 | * | 6/2000 | Towler | 280/728.3 |
| 6,106,003 | * | 8/2000 | Rahmstorf et al. | 280/728.3 |
| 6,164,690 | * | 12/2000 | Vian | 280/731 |

FOREIGN PATENT DOCUMENTS

| 41 37 926 | | 5/1992 | (DE) . |
|---|---|---|---|
| 41 39 010 | | 6/1992 | (DE) . |
| 296 02 835 | | 1/1997 | (DE) . |
| 196 17 758 | | 9/1997 | (DE) . |
| 297 15 185 | | 1/1998 | (DE) . |
| 002270657 | * | 3/1994 | (GB) . |
| 405301556 | * | 11/1993 | (JP) . |

* cited by examiner

Primary Examiner—Michael Mar
Assistant Examiner—Ruth Ilan
(74) Attorney, Agent, or Firm—Evenson, McKeown, Edwards & Lenahan, P.L.L.C.

(57) ABSTRACT

An air bag system, for example for a steering wheel, in which a surface of the cushioning arrangement facing the vehicle interior is at least partially covered by a thin-walled sheet metal unit. The sheet metal bar unit is fixedly connected with the surface of the cushioning arrangement. The sheet metal unit is provided with at least one turned-in edge toward the inside of the cushioning arrangement in the area of lateral edges of the cushioning arrangement as well as in the area of the at least one tear edge.

20 Claims, 3 Drawing Sheets

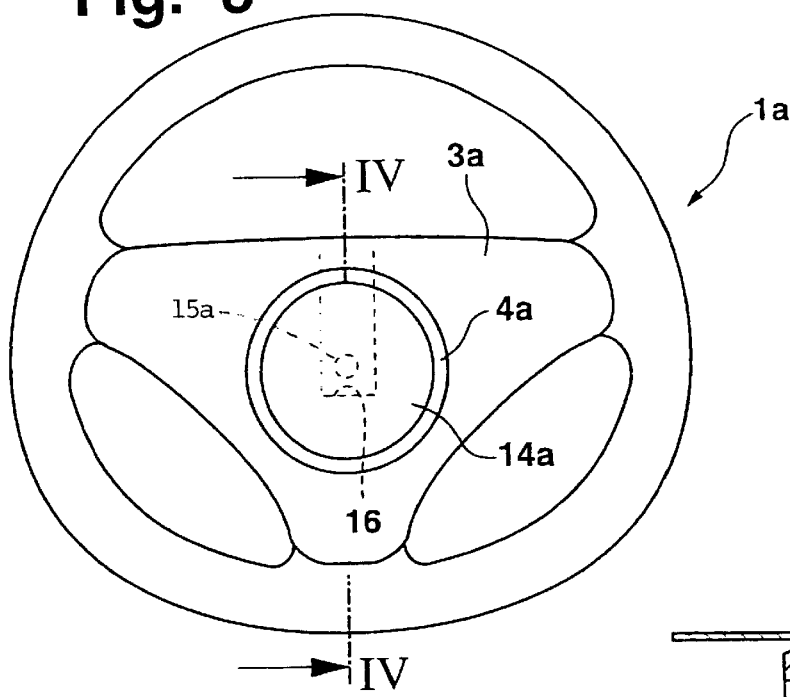
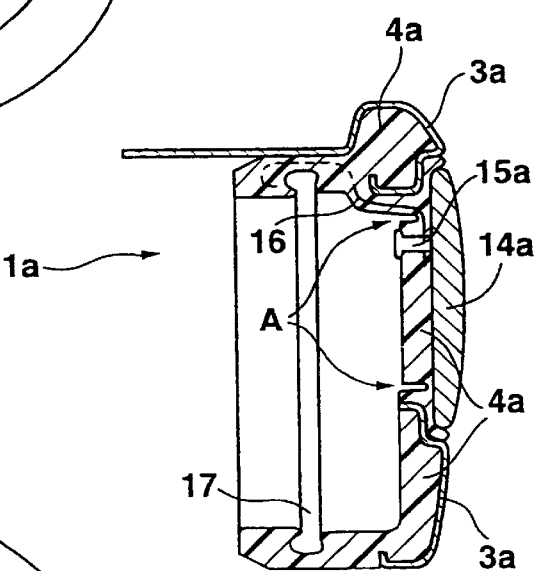
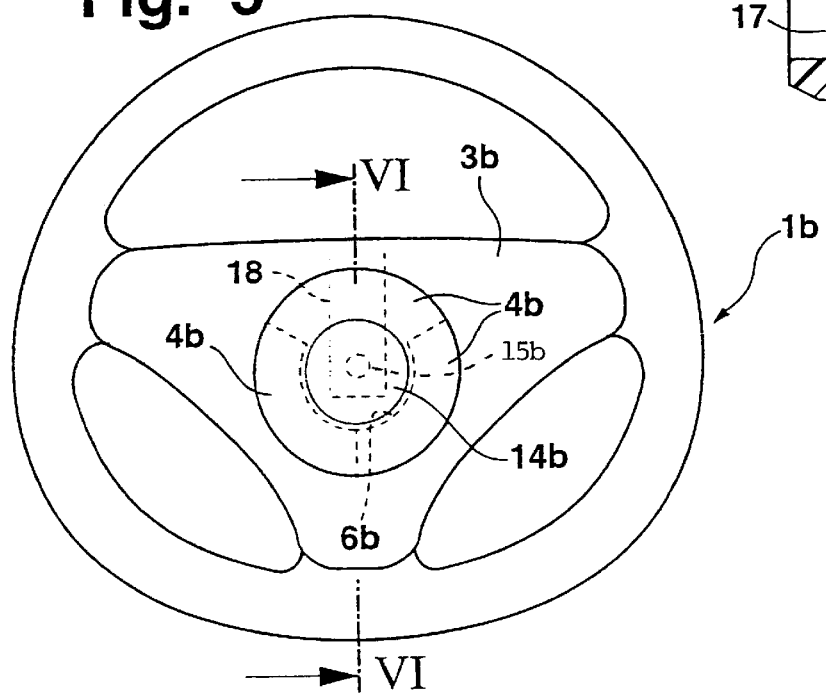

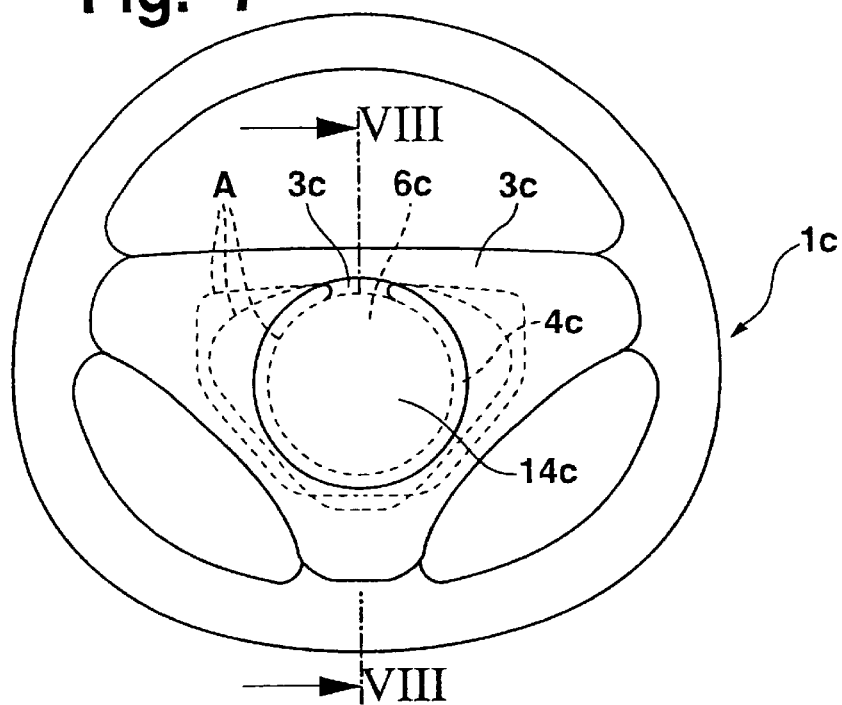
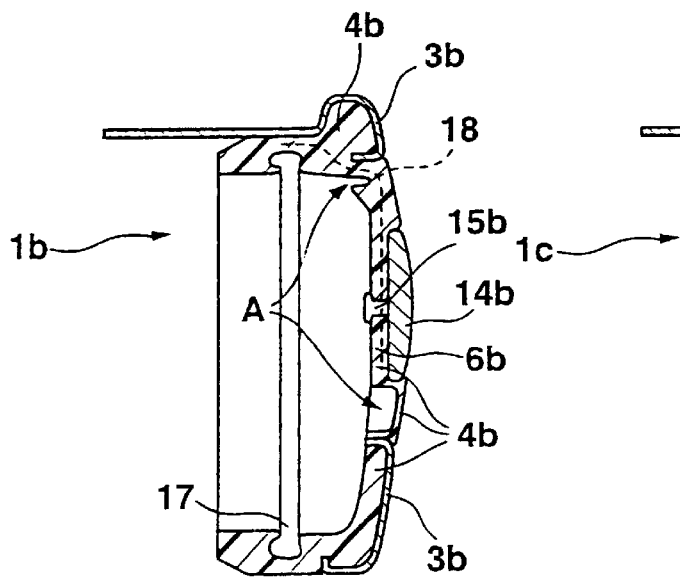
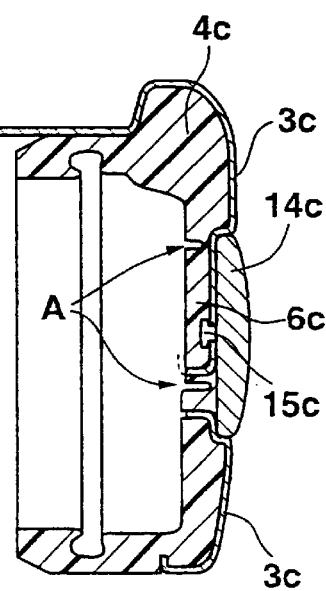

AIR BAG SYSTEM FOR A MOTOR VEHICLE

BACKGROUND AND SUMMARY OF THE INVENTION

This application claims the priority of German patent 198 29 755.6, filed Jul. 3, 1998, the disclosure of which is expressly incorporated by reference herein.

The invention relates to an air bag system for a motor vehicle, particularly in a steering wheel of a vehicle interior, having a cushioning arrangement, which extends at least over an outlet opening for an air bag unit, faces a vehicle interior and has at least one tear flap defined by a tear contour for exposing the outlet opening during an expansion of an air bag of the air bag unit.

Such an air bag system is generally known for passenger cars. The air bag system is integrated particularly in a steering wheel of the passenger car. However, in the same manner, such an air bag system is provided also in a front passenger area of a passenger car. An outlet opening of an air bag unit of the air bag system is provided on an exterior side facing the vehicle interior with a cushioning arrangement which has at least one tear contour at the level of the outlet opening for an air bag. In the event of a sudden expansion of the air bag, the cushioning arrangement is destroyed along the tear contour and the outlet opening for the expansion of the air bag is exposed.

It is an object of the invention to provide an air bag system of the initially mentioned type which, despite safety-related requirements, can be designed with an attractive appearance in the vehicle interior.

This object is achieved in that a surface of the cushioning arrangement facing the vehicle interior is covered at least partially by a thin-walled sheet metal bar unit which is fixedly connected with the surface of the cushioning arrangement and which, in the area of side edges of the cushioning arrangement as well as in the area of the at least one tear contour, is provided with at least one turned-in edge formed to the inside toward the cushioning arrangement. Particularly when the air bag system is inserted in a steering wheel, it is possible by means of the solution according to the invention to achieve for the steering wheel the impression of a metal-spoke steering wheel, and to nevertheless meet the corresponding safety requirements for today's motor vehicles. However, corresponding design-related impressions can also be achieved for a front passenger side of a center console area of the vehicle interior in that the sheet metal bar unit covers a corresponding cushioning arrangement in the center console area at the level of a front passenger air bag unit. The inwardly formed turned-in edge of the cushioning arrangement ensures that the corresponding cut edges of the sheet metal bar unit are led away from the visible surface and can therefore represent no risks of injury to the vehicle occupants. This is particularly advantageous in the event of a head impact onto the steering wheel or onto the front-passenger-side center console area. The sheet metal bar unit may be designed in one piece or consist of several pieces, as a function of the surface area of the cushioning arrangement to be covered, which may also be divided in the tear area. The tear contours may be provided on the underside of the cushioning arrangement so that they are invisible in the direction of the surface. The inwardly formed turned-in edge is advantageously at least partially embedded in the cushioning arrangement.

As a further development of the invention, the sheet metal bar unit is connected by way of at least one fastening link with a carrier arrangement for the air bag unit. This further improves the fastening of the sheet metal bar unit on the air bag system so that a tearing-off of the cushioning arrangement as well as of the sheet metal bar unit is reliably avoided during an expansion operation of the air bag system.

In a further development of the invention, the sheet metal bar unit is flatly connected with the cushioning arrangement, particularly by welding, by a spraying process or by gluing. This reliably avoids a detachment of the sheet metal bar unit from the cushioning arrangement.

In a further development of the invention, the at least one turned-in edge of the sheet metal bar unit reaches in the area of the side edges at least in sections in a form-locking manner around the side edges. This further improves the safety with respect to a detachment of the sheet metal bar unit from the cushioning arrangement.

In a further development of the invention, the at least one tear flap is covered at least partially by a medal fixedly connected with the tear flap and/or the sheet metal bar unit. A manufacturer's emblem can be mounted on this medal. The medal is designed as a plate or disk and may preferably have a round, oval or polygonal shape.

In a further development of the invention, the medal is dimensioned such that it covers the tear contour. As a result, the tear contour is arranged in an invisible manner, whereby the whole cushioning arrangement of the air bag system has an aesthetically attractive design.

Other objects, advantages and novel features of the present invention will become apparent from the following detailed description of the invention when considered in conjunction with the accompanying drawings.

BRIEF DESCRIPTION OF THE DRAWINGS

FIG. 3 is a plan view of a steering wheel similar to FIG. 1 having a cushioning arrangement provided with a sheet metal bar unit as well as with a centrally arranged medal;

FIG. 4 is a sectional view of the steering wheel according to FIG. 3 along the intersection line IV—IV in FIG. 3;

FIG. 5 is a plan view of another steering wheel similar to FIG. 3;

FIG. 6 is a sectional view of the steering wheel according to FIG. 5 along the intersection Line VI—VI in FIG. 5;

FIG. 7 is a plan view of another steering wheel similar to the steering wheels according to FIGS. 3 and 5; and FIG. 8 is a sectional view of the steering wheel according to FIG. 7 along intersection Line VIII—VIII in FIG. 7.

DETAILED DESCRIPTION OF THE DRAWINGS

Figure 1:
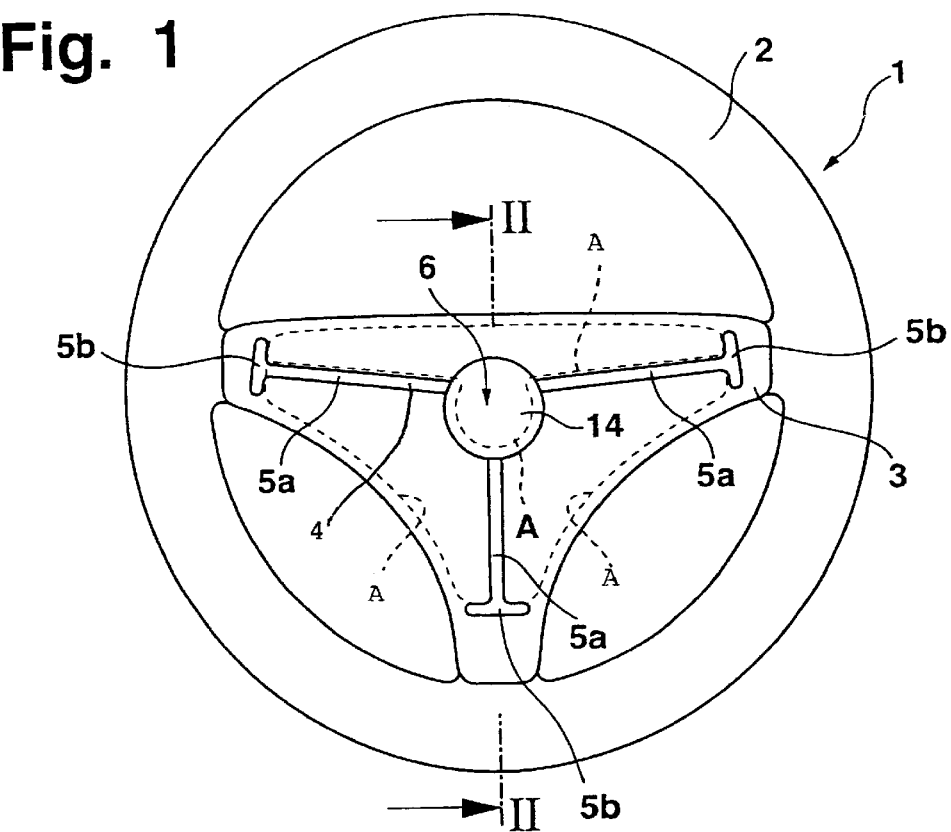
FIG. 1 is a plan view of a steering wheel of a passenger car which is provided with an air bag system according to a preferred embodiment of the present invention.

A steering wheel 1 according to FIG. 1 has a steering wheel rim 2 in which an air bag system is arranged in a manner to be described in the following. The air bag system has a cushioning arrangement 4 which forms the top side and the externally visible surface of the air bag system and which is preferably designed as an injection-molded part of a thermoplastic elastomer. The cushioning arrangement 4 forms steering wheel spokes and is fastened on its underside in a form-locking manner to a pot-type carrier arrangement 8 which carries an air bag unit 7, 9. In a manner known per se, the carrier arrangement 8 is fastened inside the steering wheel. In the illustrated embodiment, the air bag unit 7, 9 is formed by a gas generator 7 fastened on the carrier arrangement 8 as well as by an air bag 9 which is only outlined and which is folded together in its uninflated condition inside the pot-type carrier arrangement 8.

The cushioning arrangement 4 is provided with several tear edges A serving as tear contours which are situated below three slot-shaped sections 5a, which will be discussed in detail in the following. The tear edges A are in each case made as a slot-type groove from an underside into the cushioning arrangement 4. By means of the tear edges A, which extend in a star-shaped manner toward an emblem section 6 of the cushioning arrangement 4 carrying a medal 14 and partially in a surrounding manner flank the emblem section 6, three tear flap sections are formed, the emblem section 6 being assigned to an upper tear flap section.

The cushioning arrangement 4 is covered in the area of its surface facing the vehicle interior by a sheet metal unit 3 designed as a one-piece bar, which represents a thin-walled aluminum sheet bar of a thickness of preferably between 0.5 mm and 0.7 mm. The sheet metal unit 3 flatly covers the cushioning arrangement 4 and is flatly connected with the surface of the cushioning arrangement 4, particularly glued, welded or back-sprayed. In the area of cut edges of the sheet metal unit 3, the 3, has turned-in edges 12, 13 which are bent toward the inside at approximately a right angle or are formed in a different manner. The turned-in edges 12 are designed in the area of the tear edges A such that T-shaped strip areas 5a, 5b are formed which correspond approximately to the contours of the tear flap sections of the cushioning arrangement 4. In the area of these turned-in edges 12, the cut edges are bent toward the interior at a right angle and are embedded in the material of the cushioning arrangement 4. In the area of the outer edges of the cushioning arrangement 4, the turned-in edges 13 are formed toward the inside—preferably by deep-drawing or bending—and are additionally sealed in a form-locking manner with the cushioning arrangement 4 at points distributed along the circumference of the cushioning arrangement 4.

The medal 14 is fastened on a section of the sheet metal unit 3 stepped in the area of the emblem section 6. In the illustrated embodiment, they are connected, even before the flat connection with the cushioning arrangement 4, in an opening of the sheet metal unit 3, in a form-locking manner by back-spraying by means of an injection pin.

In addition, the sheet metal unit 3 has several fastening links 11 which are distributed over its circumference and which are molded in one piece to the turned-in edges 13 and project toward the inside to the level of the carrier arrangement 8 of the air bag system. The fastening links 11 are connected with the carrier arrangement 8 by means riveted joints 10 or other fastening devices in an undetachable and force-transmitting manner.

In the plan view, almost only the sheet metal unit 3 and the medal 14, which also covers the emblem section 6, are visible in the spoke area of the steering wheel 1. The cushioning arrangement situated under the sheet metal unit 3 is visible only at the level of the strip areas 5a, 5b. The strip areas 5a, 5b are selected such that the sheet metal unit 3 covering the cushioning arrangement 4 does not hinder the tear flap function of the cushioning arrangement 4 in the event of a sudden expansion of the air bag 9.

Figure 2:
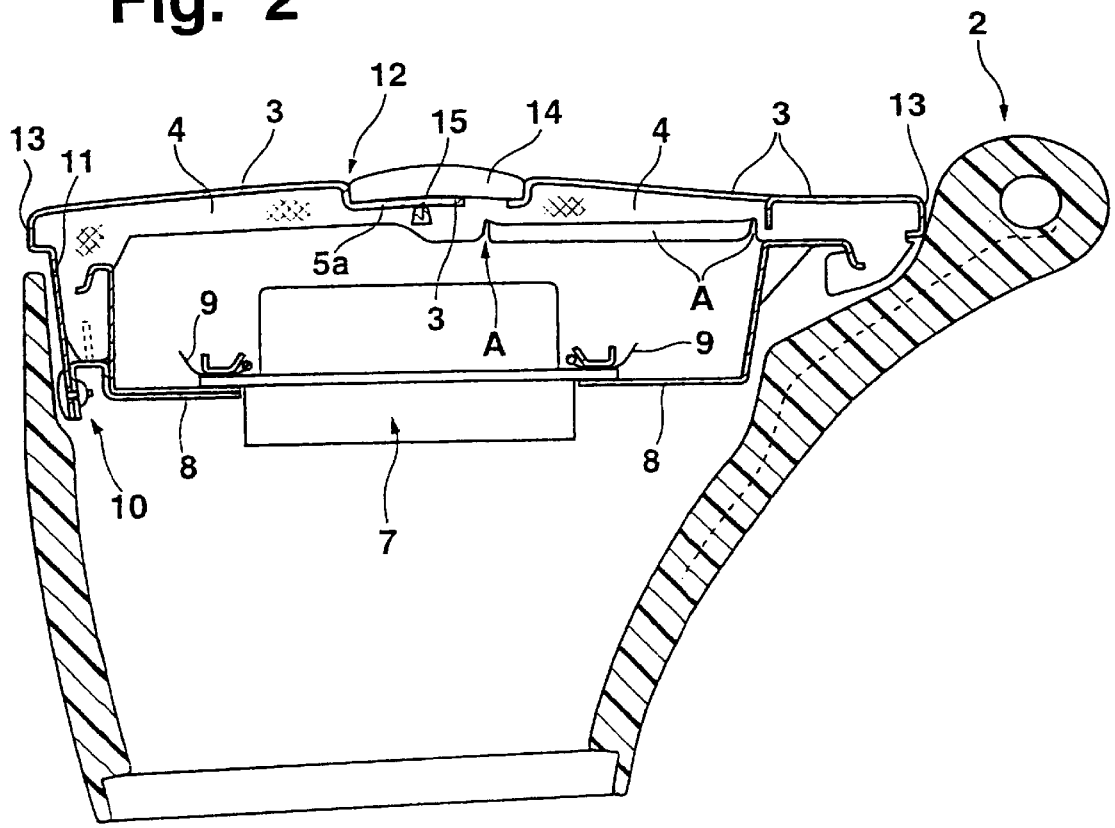
FIG. 2 is a sectional view of the steering wheel according to FIG. 1 along intersection Line II—II in FIG. 1.

The embodiments according to FIGS. 3 to 8 described in the following each have sheet metal unit 3a to 3c which, analogously to the above-described embodiment, are flatly connected with a cushioning arrangement 4a to 4c corresponding to the above-described cushioning arrangement 4. In the case of the steering wheels 1a to 1c described in the following, only the differences with respect to the embodiment according to FIGS. 1 and 2 will be described again in detail. In this case, the steering wheels 1a to 1c also have air bag systems which are constructed analogously to the air bag system according to FIGS. 1 and 2. Particularly the design and the linking of the sheet metal bar units 3a to 3c as well as the presence of a carrier arrangement for the air bag unit and the presence of the air bag system itself will not be described again in detail at this point. In this respect, reference is made to the above disclosure.

The steering wheel 1a according to FIGS. 3 and 4 has a central disk-shaped medal 14a which, in the illustrated embodiment, consists of plastic and by means of at least one injection pin 15a is back-sprayed with the cushioning arrangement 4a; that is, flatly connected by means of an injection molding arrangement. The sheet metal bar arrangement 3a ends in the area of the emblem section of the cushioning arrangement defined by the medal 14a. The medal 14a covers a surrounding circular tear contour A.

In the embodiments according to FIGS. 3 to 6, the reference number 17 in each case indicates an additional securing groove for a back-snapping for the air bag system, which is known per se.

The tear flap which is formed by the surrounding tear contours A and is also disk-shaped and has a smaller diameter than the medal 14a, is connected by way of a hinge arrangement in the form of a hinge joint 16 including the medal 14a with the outer areas of the cushioning arrangement 4a. In this case, the flexible hinge arrangement 16 in the form of the hinge joint is embedded in the cushioning arrangement 4a so that, even in the event of a sudden bursting-open of the emblem section and of the medal 14a, it cannot be removed from the cushioning arrangement 4a by the triggering of the air bag. The hinge joint 16 reaches in a form-locking manner around the injection pin 15a in the area of the emblem section of the cushioning arrangement 4a, whereby an additional securing of the medal 14a and of the emblem section are achieved. As illustrated in FIG. 3, a narrow circular gap remains between the sheet metal unit 3a and the medal 14a which shows the cushioning arrangement 4a.

The steering wheel 1b according to FIGS. 5 and 6 also has a sheet metal unit 3b which encloses a tear area of the cushioning arrangement 4b. Concentric within the circular tear area of the cushioning arrangement 4b, a medal 14b is arranged. Analogously to the above-described embodiment, the medal 14b is form-lockingly connected via an injection pin 15b with the cushioning arrangement 4b by way of back-spraying. By means of corresponding tear contours A, the cushioning arrangement 4b forms a total of three circular ring sections. On the circular ring section which is on top in FIG. 5, an emblem section 6b is molded on in one piece which carries the medal 14b. The tear contour surrounds this emblem section 6b similarly to the embodiment shown in FIG. 1. The tear area of the cushioning arrangement 4b therefore forms three circular-ring-segment-shaped tear flaps which tear open with small swivelling radii. The upper tear flap, which carries the medal 14b by way of its emblem section 6b, is also connected via a flexible hinge joint 18 with the cushioning arrangement 4b provided in the area of the sheet metal unit 3b, the hinge joint 18 being integrated in the cushioning arrangement 4b and the emblem section 6b. The hinge joint 18 also reaches around the injection pin 15b of the medal 14b in a form-locking manner, in that it has a recess at this level.

In the event that the air bag is triggered, the medal 14b, including the pertaining emblem section 6b, is therefore held on the steering wheel so that it cannot be lost, whereby injuries to the driver can be avoided.

In the illustrated embodiment, the steering wheel 1c according to FIGS. 7 and 8 has a three-spoke design.

However, in the same manner, it may also be constructed with four spokes without any differences with respect to the characteristics described in the following. In the case of this steering wheel 1c, the sheet metal unit 3c covers almost the entire surface of the cushioning arrangement 4c. It ends in the area of a circular emblem section 6c which carries a medal 14c. By means of a surrounding tear contour A, which may have a circular, elliptical or polygonal design, the tear flap of the cushioning arrangement 4c is formed which, in the embodiment according to FIGS. 7 and 8, is identical with the emblem section 6c. In the embodiment according to FIGS. 7 and 8, the sheet metal unit 3c itself acts as the hinge arrangement, in that a strip section of the sheet metal bar unit 3c is continued into the emblem section 6c according to FIG. 8. The medal 14c reaches by way of a corresponding injection-molded nose 15c in a form-locking manner behind this strip section of the sheet metal unit 3c, the fastening of the medal 14c on the sheet metal unit 3c corresponding to the arrangement according to FIG. 2. The medal 14c is constructed to be so large that it completely covers the tear flap and thus the emblem section 6c of the cushioning arrangement 4c. This is also illustrated by broken reference lines in FIG. 7. A tear flap with a polygonal tear contour A is particularly advantageous for this embodiment if, in the area of the strip section of the sheet metal unit 3c, which forms the hinge arrangement, the tear contour A extends in a straight line A. As a result, a largely tension-free swivelling-open of the strip section and of the medal 14c is achieved. The strip section therefore has a web-shaped design.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Air bag system for a motor vehicle, comprising a cushioning arrangement which extends at least over an outlet opening for an air bag unit, said cushioning arrangement facing a vehicle interior and having at least one tear flap defined by a tear contour for exposing the outlet opening during an expansion of an air bag of the air bag unit, wherein a surface of the cushioning arrangement facing the vehicle interior is covered at least partially by a thin-walled sheet metal unit, forming a surface of the vehicle interior, and which is fixedly connected with the surface of the cushioning arrangement and which, in an area of side edges of the cushioning arrangement as well as in an area of the at least one tear contours is provided in each of said areas with at least one turned-in edge formed toward the inside of the cushioning arrangement.

2. Air bag system according to claim 1, wherein said air bag unit and said cushioning arrangement are disposed on a steering wheel.

3. Air bag system according to claim 1, wherein the sheet metal unit is connected via at least one fastening link with a carrier arrangement for the air bag unit.

4. Air bag system according to claim 1, wherein the at least one turned-in edge of the sheet metal unit, in the area of the side edges of the cushioning arrangement, reaches in a form-locking manner at least in sections around the side edges.

5. Air bag system according to claim 1, wherein the sheet metal unit is glued in a flat manner to the cushioning arrangement.

6. Air bag system according to claim 1, wherein the at least one tear flap is at least partially covered by a medal fixedly connected with at least one of the tear flap and the sheet metal unit.

7. Air bag system according to claim 6, wherein the medal has dimensions such that the medal covers the tear contour.

8. Air bag system according to claim 6, wherein the medal is fixedly connected with the sheet metal unit.

9. Air bag system according to claim 6, wherein the medal is connected by way of a flexible hinge arrangement with the cushioning arrangement.

10. Air bag system according to claim 9, wherein the hinge arrangement is formed by at least one hinge joint.

11. Steering wheel for a vehicle interior of a passenger car having an air bag system and a cushioning arrangement covering the air bag system, said air bag system comprising a cushioning arrangement which extends at least over an outlet opening for an air bag unit, said cushioning arrangement facing a vehicle interior and having at least one tear flap defined by a tear contour for exposing the outlet opening during an expansion of an air bag of the air bag unit, wherein a surface of the cushioning arrangement facing the vehicle interior is covered at least partially by a thin-walled sheet metal unit, forming a surface of the vehicle interior, and which is fixedly connected with the surface of the cushioning arrangement and which, in an area of side edges of the cushioning arrangement as well as in an area of the at least one tear contours, is provided in each of said areas with at least one turned-in edge formed toward the inside to the cushioning arrangement.

12. Covering arrangement for a motor vehicle air bag unit having an air bag, comprising:

a cushioning arrangement to be arranged in front of the air bag unit, said cushioning arrangement defining at least one tear contour to be torn by said air bag upon expansion of said air bag; and a metal cover unit fixedly coupled to said cushioning arrangement, said metal cover unit at least partially covering a surface of the cushioning arrangement, said metal cover unit including at least one turned-in edge turned toward the inside of the cushioning arrangement and forming a surface of the vehicle interior, said at least one turned-in edge being located proximate at least one of said at least one tear contour and a side edge of the cushioning arrangement.

13. Covering arrangement according to claim 12, wherein said air bag unit and said cushioning arrangement are disposed on a steering wheel.

14. Covering arrangement according to claim 12, wherein the metal cover unit is connected via at least one fastening link with a carrier arrangement for the air bag unit.

15. Covering arrangement according to claim 12, wherein the at least one turned-in edge of the metal cover unit, in the area of the side edges of the cushioning arrangement, reaches in a form-locking manner around the side edges.

16. Covering arrangement according to claim 12, wherein the metal cover unit is glued to the cushioning arrangement.

17. Covering arrangement according to claim 12, wherein the at least one tear contour defines a respective tear flap, said tear flap being at least partially covered by a medal fixedly connected with at least one of the tear flap and the metal cover unit.

18. Covering arrangement according to claim 17, wherein the medal has dimensions such that the medal covers the tear contour.

19. Covering arrangement according to claim 17, wherein the medal is connected by way of a flexible hinge arrangement with the cushioning arrangement.

20. Covering arrangement according to claim 19, wherein the hinge arrangement is formed by at least one hinge joint.

* * * * *